United States Patent Office 3,337,415
Patented Aug. 22, 1967

3,337,415
METHOD OF PREPARING 6-AMINO-
PENICILLANIC ACID
Ernst Brandl, Alfred Schmid, and Helmut Steiner, Kundl, Tyrol, Austria, assignors to Biochemie Gesellschaft mit beschrankter Haftung, Kundl, Tyrol, Austria, a corporation of Austria
No Drawing. Filed Feb. 12, 1963, Ser. No. 257,858
Claims priority, application Austria, Feb. 14, 1962,
A 1,250/62
9 Claims. (Cl. 195—36)

The present invention relates to a method of producing 6-aminopenicillanic acid by enzymatic cleavage of phenoxymethyl penicillin or salts thereof with microbial enzyme vehicles.

A number of processes have already been described for the preparation of 6-aminopenicillanic acid. Thus, 6-aminopenicillanic acid can be prepared by "precursorless" fermentation using conventional fungi for the formation of penicillin in a culture medium of conventional composition. Alternatively—and the method according to the present invention is a further development of this kind of process for the perparation of 6-aminopenicillanic acid—preformed penicillins may be used as the starting material and the side chain may be split off in these penicillins enzymatically. The cleavage of phenoxymethyl penicillin has in particular been carried out by means of penicillinamidases from fungi and a number of fungi have also been used for the enzymatic cleavage of phenoxymethyl penicillin. The attempt has already been made to increase the yields of 6-aminopenicillanic acid from cleaving penicillin G by adding phenylacetic acid or derivatives thereof in propagating a strain of E. coli suitable for cleaving penicillin G.

When the fungi used are those known for cleaving phenoxymethyl penicillin to form 6-aminopenicillanic acid, there is always a lag phase of varying duration. During this lag phase not only is no enzyme activity observed in the presence of the penicillin to be cleaved (the substrate), but also undesirable destruction of the penicillin occurs.

Attempts to influence the cleavage of phenoxymethyl-penicillin by actinomycetes and fungi by adding phenoxyacetic acid or 6-aminopenicillanic acid together with the substrate have shown that addition of phenoxyacetic acid has no effect, while addition of 6-aminopenicillanic acid results in a reduction of the yield (Proceeedings of the Royal Society, volume 154, pages 522–531; 1961). It has also been found that phenoxymethylpenicillin-cleaving fungi cultivated in a medium modified by the addition of phenylacetic acid did not give an increased yield in subsequent cleavage.

It has now been found that with certain microorganisms suitable for cleaving phenoxymethylpenicillin, in particular fusaria and yeasts, the lag phase during which no enzyme activity is observed can be reduced by adding small quantities of phenoxyacetic acid, 6-aminopenicillanic acid or salts thereof during a preceding growth phase. This apparently results in an adaptive formation of an active enzyme during growth. By this means, enzymatic cleavage by the enzyme vehicle begins immediately after adding the substrate and relatively high yields of 6-aminopenicillanic acid are obtained in a shorter time.

It is one object of the present invention to provide a simple and effective process of producing 6-amino-penicillanic acid by enzymatic cleavage of phenoxymethyl-penicillin and salts thereof.

A further object of the present invention is to provide a process of producing 6-aminopenicillanic acid by enzymatic cleavage of phenoxymethyl penicillin and salts thereof during which the lag phase is reduced.

Still another object of the present invention is to provide a process of producing 6-aminopenicillanic acid by enzymatic cleavage of phenoxymethyl penicillin and salts thereof, in which the enzymatic cleavage begins immediately after adding the substrate.

Other objects of the present invention and advantageous features thereof will become apparent as the description proceeds.

According to the present invention, a process of producing 6-aminopenicillanic acid comprises contacting phenoxymethyl penicillin, or a salt thereof, with a culture selected from the group consisting of *Fusarium anguioides,, Fusarium culmorum, Fusarium oxysporum, Fusarium semitectum, Fusarium lycopersici* and *Torulopsis albida* grown in the presence of phenoxyacetic acid, 6-aminopenicillanic acid or a salt of either of these acids, individually or in admixture.

Tests have shown that the adaptive formation of activators suitable for cleaving phenoxymethyl penicillin (which formation takes place when the enzyme vehicle is supplied) by the addition of 6-aminopenicillanic acid and/or phenoxyacetic acid seems not to be a generally applicable principle since no reduction of the lag phase or any reduction of the duration and increase of the cleavage process could be observed when this step had been applied to other phenoxymethyl penicillin-cleaving microorganisms.

The phenoxyacetic acid, 6-aminopenicillanic acid or salt of these acids is preferably used, in growing said cultures selected from the group consisting of *Fusarium anguioides, Fusarium culmorum, Fusarium oxysporum, Fusarium semitectum, Fusarium lycopersici* and *Torulopsis albida,* in a concentration of from 0.001% to 2.0%, more particularly about 0.2%, the optimum concentration depending on the nature of the microorganism used. The adaption process may advantageously be performed in consecutive stages in which the quantity of 6-aminopenicillanic acid and/or phenoxyacetic acid added is gradually increased; alternatively, a single adaptation may be effected, for example during the growth stage immediately preceding the cleavage operation.

The following examples further illustrate the present invention. The numerical values given in the tables in the examples are units per milliliter.

Example 1

A. A culture of *Fusarium anuioides* was grown in 500 ml. Erlenmeyer flasks filled with 100 ml. of a sterile nutrient solution of the following composition, a shaking machine having a 40 mm. stroke at 200 r.p.m. being used for the cultivation process at a temperature of 25° C.

| | Percent |
|---|---|
| Brewer's yeast autolysate-nitrogen | 0.15 |
| Glucose | 4.0 |
| Calcium carbonate | 1.0 |
| pH 6.0. | |

B. Under identical conditions, a further culture of the same organism was grown except that 1.1% 6-aminopenicillanic acid was added to the nutrient solution. After a fermentation time of 40 hours, 15,000 units per milliliter of potassium penicillin V were added to each of the cultures of A and B. The fermentation process was then continued under the above conditions.

The resultant 6-aminopenicillanic acid and the residual penicillin were determined iodometrically at 12, 24 and 36 hours after the penicillin addition. The procedure was as follows: The penicillin was conventionally extracted with an organic solvent at an acid pH and was tested after transfer to a buffer solution; the 6-aminopenicillanic acid was determined directly in the aqueous phase after neutralisation. The results are given in the following table.

| Fermentation time in hours | Quantity of— | Preparation A | Preparation B |
|---|---|---|---|
| 12 | 6-aminopenicillanic acid | 1,060 | 3,640 |
|  | Penicillin | 13,820 | 9,600 |
| 24 | 6-aminopenicillanic acid | 2,700 | 5,740 |
|  | Penicillin | 11,450 | 8,200 |
| 36 | 6-aminopenicillanic acid | 4,100 | 9,320 |
|  | Penicillin | 8,380 | 4,100 |

Example 2

A. A culture of *Fusarium culmorum* was grown on the following sterile nutrient solution which was introduced into 2 liter Erlenmeyer flasks in quantities of 200 ml.

|  | Percent |
|---|---|
| Corn steep liquor-nitrogen | 0.15 |
| Brewers' yeast autolysate-nitrogen | 0.1 |
| Glucose | 1.0 |
| Calcium carbonate (sterilised separately) | 0.7 |
| pH 6.5. | |

After shaking for 48 hours at 28° C. on a rotary shaker at 250 r.p.m. and 40 mm. stroke, the contents of the two flasks were used as inoculant for 10 liters Nirosta fermenters with a vortex system. After a growth stage of 36 hours, 40,000 units per milliliter of potassium penicillin V were added to these fermenters. The resultant 6-aminopencillanic acid and the residual penicillin (after extraction) were determined iodometrically at 12, 36 and 48 hours after the penicillin addition.

B. In performing a parallel test the same procedure as under A was carried out except that 0.3% of phenoxyacetic acid was added at the beginning of the growth phase to each fermenter. The resultant 6-aminopenicillanic acid and the residual penicillin were determined as indicated under A. The results are given in the following table.

| Fermentation time in hours | Quantity of— | Preparation A | Preparation B |
|---|---|---|---|
| 12 | 6-aminopenicillanic acid | 1,800 | 2,680 |
|  | Penicillin | 34,960 | 33,090 |
| 36 | 6-aminopenicillanic acid | 2,320 | 4,940 |
|  | Penicillin | 32,490 | 30,170 |
| 48 | 6-aminopenicillanic acid | 3,140 | 12,830 |
|  | Penicillin | 30,530 | 23,200 |

Example 3

A. A culture of *Fusarium oxysporum* was grown on the following sterile nutrient solution in the manner described in Example 2A.

|  | Percent |
|---|---|
| Ammonium acetate | 0.5 |
| Ammonium lactate | 0.5 |
| Ammonium sulphate | 0.1 |
| Copper, iron, manganese, magnesium, zinc | Traces |
| Calcium carbonate (sterilised separately) | 1.0 |
| pH 7.0. | |

2 liters of a culture broth obtained in this way and 97 hours old were used as inoculant for a submerged fermentation vessel equipped with a baffle system and filled with 15 liters of nutrient solution of the above composition. After fermenting for 36 hours, 30,000 units per milliliter of potassium penicillin V were added and 6-aminopenicillanic acid and penicillin were determined as previously.

B. Parallel tests were carried out as under A but with an addition of 0.05% phenoxyacetic acid to the first stage and 0.1% phenoxyacetic acid to the second stage.

| Fermentation time in hours | Quantity of— | Preparation A | Preparation B |
|---|---|---|---|
| 10 | 6-aminopenicillanic acid | 3,020 | 24,280 |
|  | Penicillin | 23,930 | 3,150 |
| 24 | 6-aminopenicillanic acid | 6,730 | 22,060 |
|  | Penicillin | 20,140 | 2,200 |
| 36 | 6-aminopenicillanic acid | 13,640 | 20,430 |
|  | Penicillin | 10,460 | 1,940 |

Example 4

A. A culture of *Torulopsis albida* was grown on a sterile nutrient solution of the following composition:

|  | Percent |
|---|---|
| Brewers' yeast autolysate-nitrogen | 0.05 |
| Asparagine | 0.1 |
| Glucose | 1.5 |
| Calcium carbonate | 0.5 |
| pH 5.5, | | and 60 ml. were introduced into a 500 ml. Erlenmeyer flask and fermented at 30° C. using a rotary shaker at 250 r.p.m. and 30 mm. stroke.

After 24 hours, the contents of the flask were washed three times with 60 ml. of sterile water after filtration and suspended in the same quantity of water; 28,000 units per milliliter potassium penicillin V were then added and the resultant 6-aminopenicillanic acid and the residual penicillin were determined by an iodometric test after further periods of 10, 20 and 30 hours.

B. In parallel tests, after a 12-hour fermentation period, 0.15% of phenoxyacetic acid was added and the procedure was carried out as in A.

| Fermentation time in hours | Quantity of— | Preparation A | Preparation B |
|---|---|---|---|
| 10 | 6-aminopenicillanic acid | 2,130 | 6,890 |
|  | Penicillin | 24,720 | 19,680 |
| 20 | 6-aminopenicillanic acid | 3,550 | 11,420 |
|  | Penicillin | 22,000 | 13,270 |
| 30 | 6-aminopenicillanic acid | 5,204 | 16,600 |
|  | Penicillin | 19,770 | 9,520 |

Example 5

A. 200 ml. of the following sterile nutrient solution were introduced in each case into 2 liter Erlenmeyer flasks:

|  | Percent |
|---|---|
| Corn steep liquor-nitrogen | 0.05 |
| Brewers' yeast autolysate-nitrogen | 0.05 |
| Asparagine | 0.05 |
| Glucose | 1.0 |
| Usual trace elements, calcium carbonate | 0.5 |
| pH 6.0 | | and were inoculated with a *Fusarium semitectum* culture spore suspension obtained from an agar slant.

After growing for 24 hours at 28° C. while shaking on a longitudinal shaker at 100 oscillations per minute and a stroke of 25 mm., 5% of this mycelium broth was used to inoculate a submersion vessel of a capacity of 80 liters of a sterile nutrient solution of the above composition. After 36 hours fermenting the resulting culture broth was filtered and the mycelium residue was made up to the original volume with water. After adding 30,000 units per milliliter of potassium penicillin V the suspension was left to stand and tested for the 6-aminopenicillanic acid and penicillin content after 8, 16 and 24 hours.

B. A parallel test was carried out as described in A but with the addition of 0.2% phenoxyacetic acid to the inoculating material nutrient solution.

| Fermentation time in hours | Quantity of— | Preparation A | Preparation B |
|---|---|---|---|
| 8 | 6-aminopenicillanic acid | 1,200 | 23,360 |
|  | Penicillin | 27,080 | 4,450 |
| 16 | 6-aminopenicillanic acid | 1,800 | 26,270 |
|  | Penicillin | 26,100 | 2,100 |
| 24 | 6-aminopenicillanic acid | 2,300 | 26,680 |
|  | Penicillin | 25,650 | 1,100 |

*Example 6*

A. A culture of *Fusarium lycopersici* was grown in a sterile nutrient solution of the following composition in the manner as described in Example 5A.

|  | Percent |
|---|---|
| Soybean flour-nitrogen | 0.1 |
| Ammonium sulphate | 0.2 |
| Glucose | 0.5 |
| Lactose | 0.5 |
| Calcium carbonate (sterilised separately) | 1.0 | pH 7.0.

40 liters of a culture broth obtained as described in Example 5A and 36 hours old were used as inoculant for a submerged fermentation vessel equipped as in Example 5 and containing 200 liters of the above mentioned nutrient solution. After fermenting for 48 hours, 20,000 units per milliliter of potassium penicillin V were added. Penicillin and 6-aminopenicillanic acid were determined at 8, 16 and 24 hours after the penicillin addition.

B. In performing a parallel test the same procedure as under A was carried out except that 0.1% 6-aminopenicillanic acid were added at the beginning of the growth phase to the inoculating material nutrient solution.

| Fermentation time in hours | Quantity of— | Preparation A | Preparation B |
|---|---|---|---|
| 8 | 6-aminopenicillanic acid | 670 | 5,840 |
|  | Penicillin | 18,130 | 14,070 |
| 16 | 6-aminopenicillanic acid | 2,200 | 8,730 |
|  | Penicillin | 16,870 | 11,410 |
| 24 | 6-aminopenicillanic acid | 3,980 | 11,690 |
|  | Penicillin | 15,460 | 7,780 |

Of course, many changes and variations in the process of producing 6-aminopenicillanic acid may be made by those skilled in the art in accordance with the principles set forth herein and in the claims annexed hereto.

We claim:

1. In a process of producing 6-aminopenicillanic acid by enzymatic cleavage of phenoxymethyl penicillin and the potassium salt thereof, the step of effecting the cleavage by contacting the penicillin starting material with a culture of a Fusarium species selected from the group consisting of *Fusarium anguioides, Fusarium culmorum, Fusarium oxysporum, Fusarium semitectum* and *Fusarium lycopersici*, said culture having first been grown in the presence of a substance selected from the group consisting of phenoxyacetic acid, 6-aminopenicillanic acid and salts of the said acids.

2. In a process of producing 6-aminopenicillanic acid by enzymatic cleavage of phenoxymethyl penicillin and the potassium salt thereof, the step of effecting the cleavage by contacting the penicillin starting material with a culture of *Torulopsis albida*, said culture having been grown in the presence of a substance selected from the group consisting of phenoxyacetic acid, 6-aminopenicillanic acid and salts of said acids.

3. In a process of producing 6-aminopenicillanic acid by enzymatic cleavage of phenoxymethyl penicillin and the potassium salt thereof, the step of effecting the cleavage by contacting the penicillin starting material with a culture of a Fusarium species selected from the group consisting of *Fusarium anguioides, Fusarium culmorum, Fusarium oxysporum, Fusarium semitectum* and *Fusarium lycopersici*, said culture having first been grown in the presence of from 0.001% to 2.0% of a substance selected from the group consisting of phenoxyacetic acid, 6-aminopenicillanic acid and salts of said acids.

4. In a process of producing 6-aminopenicillanic acid by enzymatic cleavage of phenoxymethyl penicillin and the potassium salt thereof, the step of effecting the cleavage by contacting the penicillin starting material with a culture of *Torulopsis albida*, said culture having been grown in the presence of from 0.001% to 2.0% of a substance selected from the group consisting of phenoxyacetic acid, 6-aminopenicillanic acid and salts of said acids.

5. In a process of producing 6-aminopenicillanic acid by enzymatic cleavage of phenoxymethyl penicillin and the potassium salt thereof, the step of effecting the cleavage by contacting the penicillin starting material with a culture of a Fusarium species selected from the group consisting of *Fusarium anguioides, Fusarium culmorum, Fusarium oxysporum, Fusarium semitectum* and *Fusarium lycopersici*, said culture having first been grown in the presence of a substance selected from the group consisting of phenoxyacetic acid, 6-aminopenicillanic acid and salts of said acids, said substance having been added during growth portionwise in gradually increasing amounts.

6. In a process of producing 6-aminopenicillanic acid by enzymatic cleavage of phenoxymethyl penicillin and the potassium salt thereof, the step of effecting the cleavage by contacting the penicillin starting material with a culture of *Torulopsis albida*, said culture having been grown in the presence of a substance selected from the group consisting of phenoxyacetic acid, 6-aminopenicillanic acid and salts of said acids, said substance having been added during growth portionwise in gradually increasing amounts.

7. A process of producing 6-aminopenicillanic acid which comprises inoculating nutrient medium with an inoculant selected from the group consisting of *Fusarium anguioides, Fusarium culmorum, Fusarium oxysporum, Fusarium semitectum, Fusarium lycopersici* and *Torulopsis albida*, incubating the inoculated medium in the presence of a substance selected from the group consisting of phenoxyacetic acid, 6-aminopenicillanic acid, and salts of said acids to produce a culture broth, adding to said culture broth a penicillin selected from the group consisting of phenoxymethyl penicillin and the potassium salt thereof, subjecting the resulting mixture to fermentation conditions, and recovering the 6-aminopenicillanic acid produced.

8. In a process of producing 6-aminopenicillanic acid by enzymatic cleavage of phenoxymethyl penicillin and the potassium salt thereof, the step of effecting the cleavage by contacting the penicillin starting material with a culture of a Fusarium species selected from the group consisting of *Fusarium anguioides, Fusarium culmorum, Fusarium oxysporum, Fusarium semitectum* and *Fusarium*

*lycopersici*, said culture having first been grown in the presence of from 0.001% to 2.0% of a substance selected from the group consisting of phenoxyacetic acid, 6-aminopenicillanic acid, and sodium, potassium, ammonium, and calcium salts of said acids.

9. In a process of producing 6-aminopenicillanic acid by enzymatic cleavage of phenoxymethyl penicillin and the potassium salt thereof, the step of effecting the cleavage by contacting the penicillin starting material with a culture of *Torulopsis albida*, said culture having been grown in the presence of from 0.001% to 2.0% of a substance selected from the group consisting of phenoxyacetic acid, 6-aminopenicillanic acid, and sodium, potassium, ammonium, and calcium salts of said acids.

References Cited

UNITED STATES PATENTS

| | | | |
|---|---|---|---|
| 3,014,846 | 12/1961 | Rolinson et al. | 195—36.01 |
| 3,032,473 | 5/1962 | Alburn et al. | 195—36.01 |
| 3,070,511 | 12/1962 | Adolfo | 195—36.01 |
| 3,161,573 | 12/1964 | Godtfredsen | 195—36 |

OTHER REFERENCES

Werkman et al.: Bacterial Physiology, 1951, Academic Press Inc., New York, pages 113 to 119.

ALVIN E. TANENHOLTZ, *Primary Examiner*.

A. LOUIS MONACELL, *Examiner*.

D. M. STEPHENS, *Assistant Examiner*.